US 8,874,889 B2

(12) United States Patent
Teng et al.

(10) Patent No.: US 8,874,889 B2
(45) Date of Patent: Oct. 28, 2014

(54) METHOD OF SWITCHING BETWEEN MULTIPLE OPERATING SYSTEMS OF COMPUTER SYSTEM

(75) Inventors: Chin-Yuan Teng, Taipei (TW); Wen-Shiu Hsu, Taipei (TW); Po-Wei Chou, Taipei (TW)

(73) Assignee: Asustek Computer Inc., Taipei (TW)

( * ) Notice: Subject to any disclaimer, the term of this patent is extended or adjusted under 35 U.S.C. 154(b) by 224 days.

(21) Appl. No.: 13/468,159

(22) Filed: May 10, 2012

(65) Prior Publication Data

US 2012/0297180 A1  Nov. 22, 2012

(30) Foreign Application Priority Data

May 18, 2011  (TW) .............................. 100117324 A

(51) Int. Cl.
*G06F 9/00* (2006.01)
*G06F 9/24* (2006.01)
*G06F 1/24* (2006.01)
*G06F 9/44* (2006.01)

(52) U.S. Cl.
CPC ..................................... *G06F 9/441* (2013.01)
USPC .................................. 713/2; 713/1; 713/100

(58) Field of Classification Search
CPC ................................................... G06F 9/4401
USPC .......................................................... 713/2
See application file for complete search history.

(56) References Cited

U.S. PATENT DOCUMENTS

| | | | |
|---|---|---|---|
| 6,772,419 B1 * | 8/2004 | Sekiguchi et al. ............ | 719/319 |
| 7,120,788 B2 | 10/2006 | Ramirez | |
| 7,356,677 B1 * | 4/2008 | Rafizadeh ......................... | 713/1 |
| 7,409,536 B2 * | 8/2008 | Guo et al. ......................... | 713/1 |
| 7,827,558 B2 | 11/2010 | Chang | |
| 7,877,592 B2 * | 1/2011 | Sun et al. ....................... | 713/100 |
| 8,146,093 B2 | 3/2012 | Li et al. | |
| 8,239,667 B2 * | 8/2012 | Durham ........................ | 713/100 |
| 8,364,943 B2 * | 1/2013 | Challener et al. ................. | 713/2 |

(Continued)

FOREIGN PATENT DOCUMENTS

| | | |
|---|---|---|
| CN | 1658185 A | 8/2005 |
| CN | 1797351 A | 7/2006 |

(Continued)

OTHER PUBLICATIONS

State Intellectual Property Office of the People's Republic of China, "Office Action", Mar. 3, 2014.
Taiwan Intellectual Property Office, "Office Action", Jun. 9, 2014.

* cited by examiner

*Primary Examiner* — Suresh Suryawanshi
(74) *Attorney, Agent, or Firm* — WPAT, PC; Justin King

(57) ABSTRACT

A method of switching between multiple operating systems of a computer system includes the following steps. Firstly, the computer system is in an environment of a first operating system. Then, a system management interrupt is triggered to allow the computer system to enter a system management mode, and a controlling authority of the computer system is transferred from the first operating system to a basic input output system. Then, a backup of a first environmental parameter of the first operating system is created. If the second environmental parameter is not included in the computer system, a second operating system is loaded in a normal mode. On the other hand, if the second environmental parameter is included in the computer system, the second operating system is booted according to the second environmental parameter.

12 Claims, 2 Drawing Sheets

(56) References Cited

U.S. PATENT DOCUMENTS

| | | |
|---|---|---|
| 2001/0018717 A1* | 8/2001 | Shimotono .................... 709/319 |
| 2005/0273663 A1* | 12/2005 | Yoon ............................... 714/36 |
| 2008/0077723 A1 | 3/2008 | Lee |
| 2010/0122077 A1 | 5/2010 | Durham |
| 2011/0040958 A1 | 2/2011 | Liang et al. |

FOREIGN PATENT DOCUMENTS

| | | |
|---|---|---|
| CN | 101149690 A | 3/2008 |
| CN | 102043670 A | 5/2011 |
| TW | 200519752 | 6/2005 |
| TW | 201106271 | 2/2011 |

METHOD OF SWITCHING BETWEEN MULTIPLE OPERATING SYSTEMS OF COMPUTER SYSTEM

This application claims the benefit of Taiwan Patent Application No. 100117324, filed May 18, 2011, the subject matter of which is incorporated herein by reference.

FIELD OF THE INVENTION

The disclosure relates to a method of managing a computer system, and more particularly to a method adapted to a computer system with multiple operating systems.

BACKGROUND OF THE INVENTION

Generally, a computer system may have multiple operating systems. After the computer is powered on, the user may select a certain operating system from a list of operating systems, and the certain operating system is loaded into the computer system. Consequently, associated application programs may be executed under the environment of the certain operating system.

From the above discussions, the user needs to determine which operation system to be loaded during the startup of the computer system. After a certain operating system is selected, if the user wants to load another operating system, the computer system should be turned off and then the booting process should be performed again. After the computer system is booted again, the user may select another operating system from the list of operating systems. In other words, the process of restarting the computer system is the only way to switch between multiple operating systems of the computer system. However, this way to switch between the multiple operating systems is time-consuming.

SUMMARY OF THE INVENTION

An embodiment of the disclosure provides a method of switching between multiple operating systems of a computer system, the method comprising steps of: allowing the computer system to be in an environment of a first operating system; triggering a system management interrupt for the computer system to enter a system management mode, and transferring a controlling authority of the computer system from the first operating system to a basic input output system; creating a backup of a first environmental parameter of the first operating system; and determining whether a second environmental parameter of a second operating system is included in the computer system, wherein if the second environmental parameter is not included in the computer system, the second operating system is loaded in a normal mode, wherein if the second environmental parameter is included in the computer system, the second operating system is loaded according to the second environmental parameter.

Another embodiment of the disclosure provides a computer system with multiple operating systems. The computer system includes a central processing unit, a control chipset, a memory, a hard disc, and a basic input output system. The control chipset is communicated with the central processing unit. The memory is communicated with the control chipset. The hard disc is communicated with the control chipset. The basic input output system is communicated with the control chipset. When the computer system is in an environment of a first operating system and a system management interrupt is triggered, the central processing unit allows the computer system to enter a system management mode. In the system management mode, a backup of a first environmental parameter of the first operating system is stored into the memory, and a second operating system is loaded by the basic input output system.

Numerous objects, features and advantages of the disclosure will be readily apparent upon a reading of the following detailed description of embodiments of the disclosure when taken in conjunction with the accompanying drawings. However, the drawings employed herein are for the purpose of descriptions and should not be regarded as limiting.

DETAILED DESCRIPTION OF PREFERRED EMBODIMENTS

In accordance with the disclosure, the central processing unit (CPU) is operated in a system management mode (SMM) to handle memory bugs or chipset bugs or implement a power management operation. In the system management mode, the controlling authority of the computer system is transferred from the operating system to the basic input output system (BIOS).

In other words, after the computer system enters the SMM, the CPU context is temporarily stored. After the controlling authority is given to the BIOS, it is necessary to backup the temporarily-stored CPU context and the data of the operating system stored in the memory. Collectively, the CPU context and the data of the operating system stored in the memory are referred to as environmental parameters.

Since it takes a very short time for allowing the computer system to enter the SMM, the waiting time is nearly imperceptible. Moreover, since it is not necessary to restart the computer system or recover the computer system from the sleep state, the time period for executing associated application programs, drivers or services will be saved. Therefore, the use of the SMM can achieve to quickly perform the method of switching between multiple operating systems of a computer system.

Figure 1:
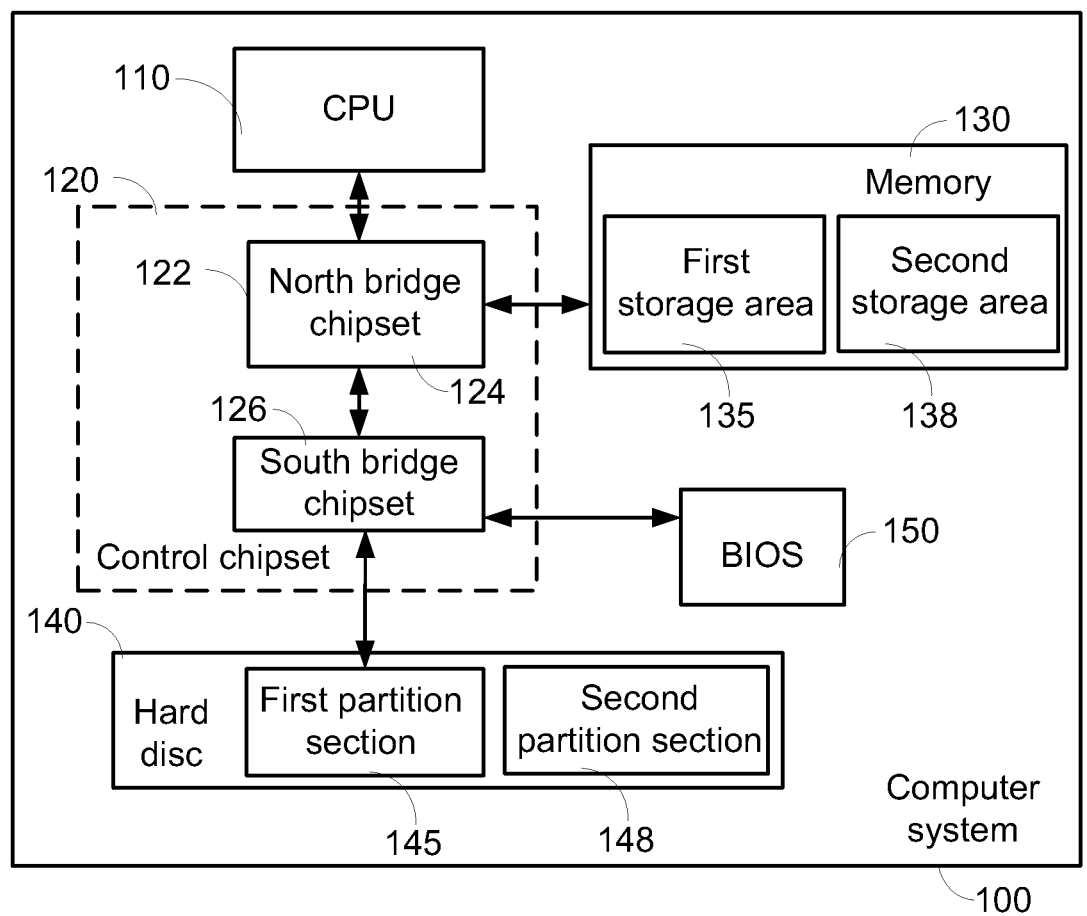
FIG. 1 is a schematic functional block diagram illustrating the architecture of a conventional computer system.

FIG. 1 is a schematic functional block diagram illustrating the architecture of a computer system according to an embodiment of the disclosure. As shown in FIG. 1, the computer system 100 comprises a central processing unit (CPU) 110, a control chipset 120, a memory 130, a hard disc 140, and a BIOS 150. The control chipset 120 comprises a north bridge chip 122 and a south bridge chip 126. The CPU 110 is communicated with the north bridge chip 122 by a front side bus. The north bridge chip 122 is communicated with the memory 130 by a memory bus. The south bridge chip 126 is communicated with the north bridge chip 122 by a private bus. In addition, the south bridge chip 126 is communicated with the hard disc 140 and the BIOS 150.

In this embodiment, the hard disc 140 is at least partitioned into a first partition section 145 and a second partition section 148. A first operating system is stored in the first partition section 145. A second operating system is stored in the second partition section 148. Moreover, during the computer system 100 is started, the memory 130 is at least divided into a first storage area 135 and a second storage area 138 by the BIOS 150.

For loading the first operating system into the computer system 100, the BIOS 150 will load the first operating system from the first partition section 145 of the hard disk 140. Under the environment of the first operating system, all data of the first operating system are temporarily stored into the first storage area 135 of the memory 130. Similarly, for loading the second operating system into the computer system 100, the BIOS 150 will boot the second operating system from the second partition section 148 of the hard disk 140. Under the environment of the second operating system, all data of the second operating system are temporarily stored into the second storage area 138 of the memory 130.

In this embodiment, both of the first operating system and the second operating system have a swap driver. In a case that the user wants to switch the operating system, the user may press down a hardware button or execute a software program to have the swap driver to issue an advanced configuration and power interface (ACPI) call and trigger a system management interrupt (SMI). Meanwhile, the controlling authority of the computer system is transferred from the operating system to the BIOS 150. Consequently, the BIOS 150 is able to switch the operating system.

Hereinafter, a process of switching the first operating system to the second operating system will be illustrated in more details. Firstly, the swap driver is controlled to issue an ACPI call and trigger an SMI. After the SMI is triggered, the CPU 110 immediately enters the SMM. Meanwhile, a backup of a first environmental parameter of the first operating system is created. For example, the CPU context is temporarily stored into the memory 130, and the backup of the data of the first operating system is stored in the first storage area 135. Then, a first interrupt point of the first operating system is recorded. Afterwards, the second operating system may be loaded into the computer system 100 by the BIOS 150.

If the second operating system has never been loaded into the computer system, the second environmental parameter of the second operating system is not included in the memory 130. Under this circumstance, the BIOS 150 will boot the second operating system to load the second operating system in a normal mode. That is, the BIOS 150 will load the second operating system from the second partition section 148 of the hard disk 140. Moreover, under the environment of the second operating system, all data of the second operating system are temporarily stored into the second storage area 138 of the memory 130.

On the other hand, if the second operating system has been loaded into the computer system, the memory 130 has the backup of a second environmental parameter of the second operating system. Under this circumstance, the BIOS 150 will restore the backup of the second environmental parameter of the second operating system from the memory 130. That is, the CPU context is restored to the CPU 110, and the data of the second operating system is restored from the second storage area 138. Afterwards, a second interrupt point of the second operating system is returned, so that the environment of the second operating system is returned again.

Figure 2:
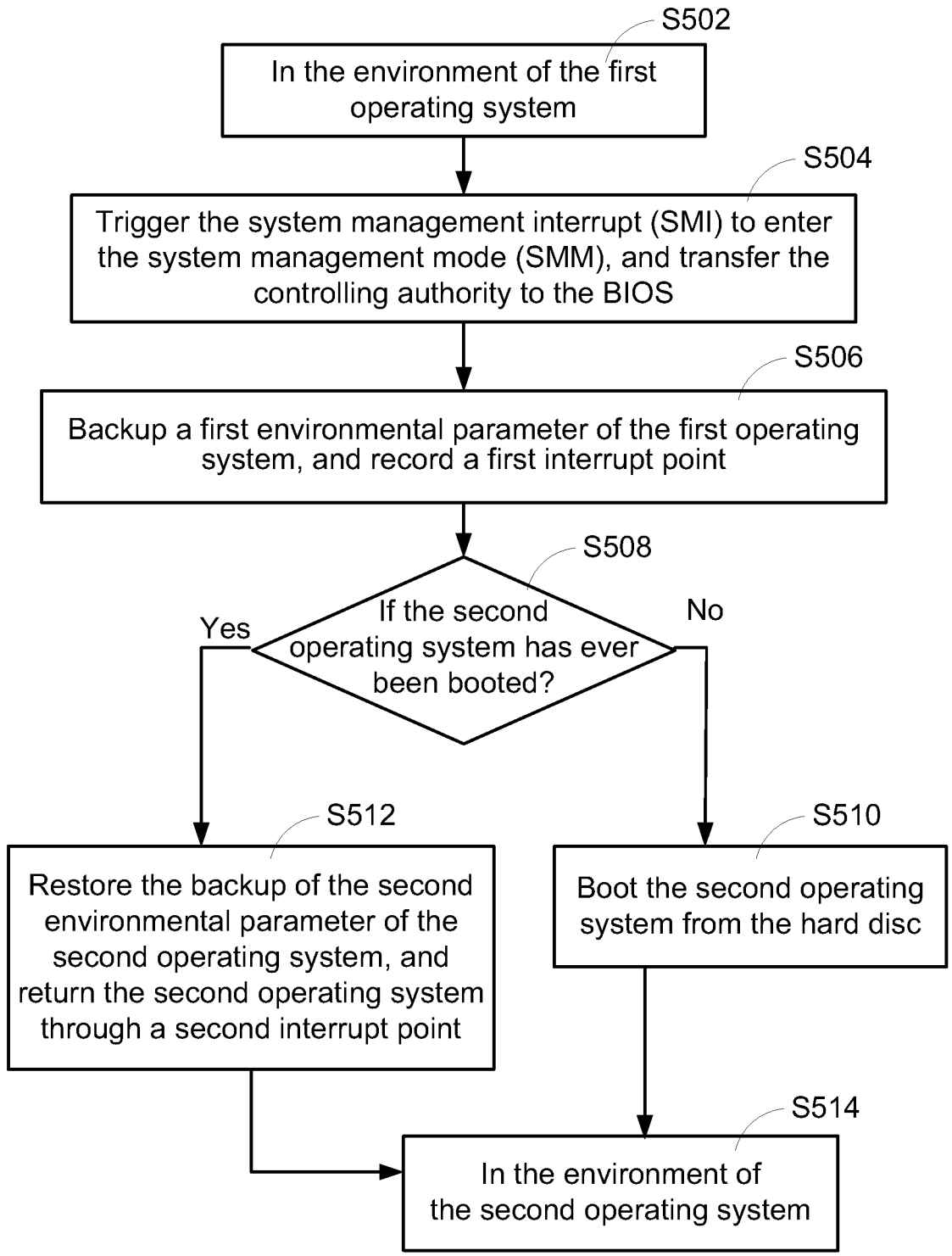
FIG. 2 is a flowchart illustrating a method of switching between multiple operating systems of a computer system according to an embodiment of the disclosure.

FIG. 2 is a flowchart illustrating a method of switching between multiple operating systems of a computer system according to an embodiment of the disclosure. The computer system is in the environment of the first operating system (Step S502). In a case that the user wants to switch the environment of the first operating system to the environment of the second operating system, the swap driver is controlled to trigger the SMI for the CPU to enter the SMM. In addition, the controlling authority of the computer system is transferred to the BIOS (Step 504). Then, a backup of a first environmental parameter of the first operating system is created, and a first interrupt point of the first operating system is recorded (Step S506). That is, this step may backup a first CPU context and a first data of the memory.

Then, the step S508 is performed to determine whether the second operating system has ever been loaded or not. That is, the step is used to determine whether the computer system has the backup of a second environmental parameter of the second operating system.

If the second operating system has never been loaded, the BIOS 150 will load the second operating system from the hard disc (Step S510). After the second operating system is loaded, the computer system is in the environment of the second operating system (Step S514).

On the other hand, if the second operating system has ever been loaded, BIOS 150 will restore the backup of the second environmental parameter of the second operating system from the memory 130. In addition, the second operating system is returned through a second interrupt point (Step S512). That is, the CPU context under the environment of the second operating system is restored to the CPU 110, and a second data of the second operating system is restored from the memory. In addition, after the second operating system is returned through the second interrupt point, the computer system is in the environment of the second operating system (Step S514).

In this embodiment, it takes a very short time for switching the operating system from the environment of the first operating system (Step S502) to the environment of the second operating system (Step S514) through the step S512. That is, according to the disclosure, the method of switching between multiple operating systems is time-saving. The flowchart of switching the second operating system to the first operating system is similar to the flowchart of FIG. 2, and is not redundantly described herein.

From the above description, the disclosure provides a method of switching between multiple operating systems of a computer system. According to the disclosure, the first operating system can be switched without the need of entering the sleep mode. Furthermore, the user can feel that the operating system is quickly switched within an imperceptible waiting time.

Moreover, during the process of switching the operating system, it is not necessary to restore the computer system to the initial state of startup. As a consequence, the method of switching between multiple operating systems according to the disclosure is time-saving.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of switching between multiple operating systems of a computer system, the method comprising steps of:
   allowing the computer system to be in an environment of a first operating system;
   triggering a system management interrupt for the computer system to enter a system management mode, and transferring a controlling authority of the computer system from the first operating system to a basic input output system;
   creating a backup of a first environmental parameter of the first operating system; and determining whether a second environmental parameter of a second operating system is included in the computer system, wherein if the second environmental parameter is not included in the computer system, the second operating system is loaded in a normal mode, wherein if the second environmental parameter is included in the computer system, the second operating system is loaded according to the second environmental parameter.

2. The method as claimed in claim 1, wherein a swap driver is loaded into the first operating system, wherein the swap driver issues an advanced configuration and power interface call to trigger the system management interrupt.

3. The method as claimed in claim 1, wherein the first environmental parameter comprises a first context of a central processing unit and a first data of a memory, and the second environmental parameter comprises a second context of the central processing unit and a second data of the memory.

4. The method as claimed in claim 3, wherein the memory comprises a first storage area and a second storage area, wherein a backup of the first data is stored in the first storage area, and a backup of the second data is stored in the second storage area.

5. The method as claimed in claim 1, wherein when the second operating system is loaded in the normal mode, the second operating system is loaded from a hard disc of the computer system.

6. The method as claimed in claim 5, wherein the hard disc comprises a first partition section and a second partition section, wherein the first operating system is stored in the first partition section, and the second operating system is stored in the second partition section.

7. A computer system with multiple operating systems, the computer system comprising:
a central processing unit;
a control chipset in communication with the central processing unit;
a memory in communication with the control chipset;
a hard disc in communication with the control chipset; and
a basic input output system in communication with the control chipset,
wherein when the computer system is in an environment of a first operating system and a system management interrupt is triggered, the central processing unit allows the computer system to enter a system management mode, wherein in the system management mode, a backup of a first environmental parameter of the first operating system is stored into the memory, and a second operating system is booted by the basic input output system.

8. The computer system as claimed in claim 7, wherein a swap driver is loaded into the first operating system, wherein the swap driver issues an advanced configuration and power interface call to trigger the system management interrupt.

9. The computer system as claimed in claim 7, wherein during the second operating system is booted by the basic input output system, the basic input output system determines whether a backup of a second environmental parameter of the second operating system is included in the computer system, wherein if the backup of the second environmental parameter is not included in the computer system, the second operating system is booted from the hard disc, wherein if the backup of the second environmental parameter is included in the computer system, the second operating system is booted according to the second environmental parameter.

10. The computer system as claimed in claim 9, wherein the first environmental parameter comprises a first context of the central processing unit and a first data of the memory, and the second environmental parameter comprises a second context of the central processing unit and a second data of the memory.

11. The computer system as claimed in claim 10, wherein the memory comprises a first storage area and a second storage area, wherein a backup of the first data of the first environmental parameter is stored in the first storage area, and a backup of the second data of the second environmental parameter is stored in the second storage area.

12. The computer system as claimed in claim 7, wherein the hard disc comprises a first partition section and a second partition section, wherein the first operating system is stored in the first partition section, and the second operating system is stored in the second partition section.

* * * * *